United States Patent [19]
Peters

[11] 3,787,733
[45] Jan. 22, 1974

[54] LIQUID LEVEL CONTROL SYSTEM

[76] Inventor: Tony Peters, 235 E. Irving Pk. Rd., Wooddale, Ill. 60191

[22] Filed: Jan. 5, 1973

[21] Appl. No.: 302,947

[52] U.S. Cl............ 307/118, 137/392, 317/DIG. 3, 340/244 C
[51] Int. Cl...................... H01h 29/00, H01h 35/18
[58] Field of Search 307/118; 73/290 R; 340/244 C, 340/245, 246; 317/DIG. 1, DIG. 3; 137/392

[56] References Cited
UNITED STATES PATENTS
3,584,643   6/1971   Burke ................................ 137/392
3,188,088   1/1964   Hanson ......................... 317/DIG. 3

Primary Examiner—Robert K. Schaefer
Assistant Examiner—William J. Smith
Attorney, Agent, or Firm—John M. Rommel, J. A. De Grandi and R. G. Kline

[57] ABSTRACT

A liquid level control system for a sump pit utilizing solid state circuitry and being operable over a wide range of liquid resistances. A pair of electrodes are disposed in the sump pit at different depths. When the liquid rises to the height of the upper-most electrode, a transistor switch is triggered which energizes two relays connected in the collector circuit of the transistor. The energization of one of the relays activates a sump pump motor for emptying liquid from the sump pit and energization of the other relay connects the lower-most electrode to the circuitry so that transistor switch does not turn off until the liquid is emptied to a level beneath the lower-most electrode.

5 Claims, 1 Drawing Figure

PATENTED JAN 22 1974
3,787,733
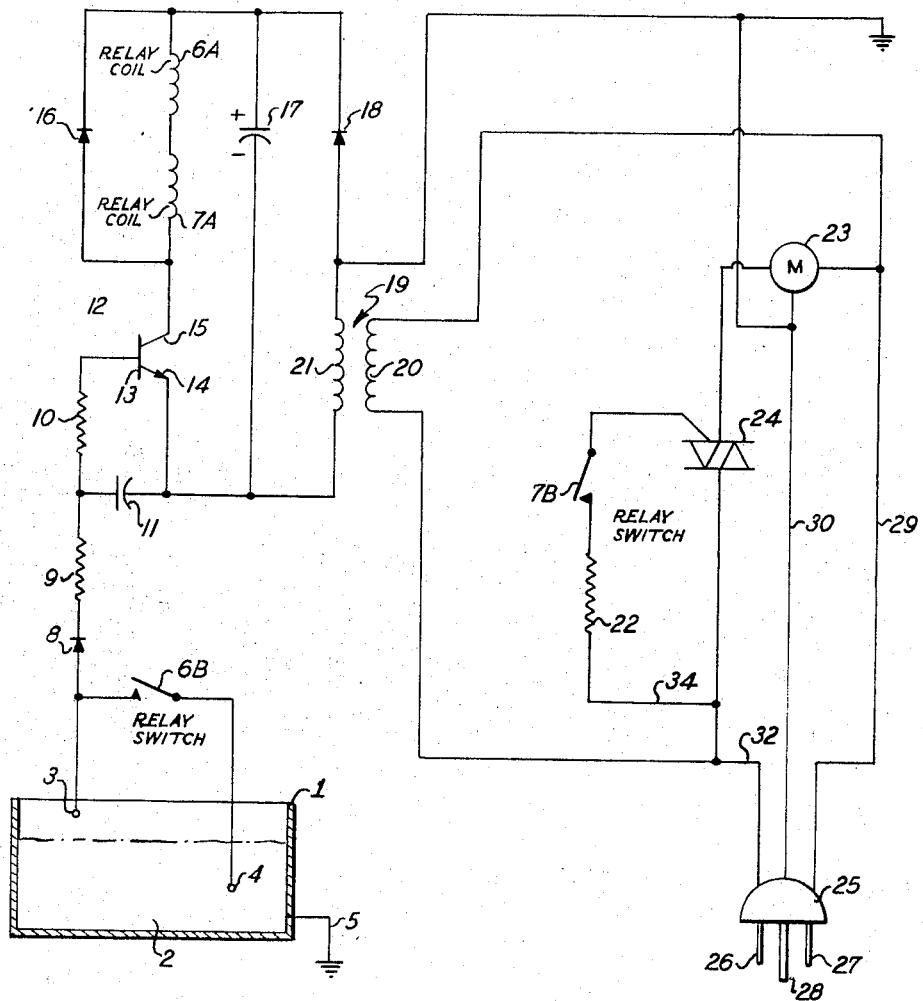

LIQUID LEVEL CONTROL SYSTEM

This invention relates to an improved system for controlling the level of liquid in a sump pit. According to the invention, a pump motor is automatically started at times when the liquid in the pit rises above a predetermined level to pump liquid from the pit and the motor is automatically stopped when the liquid falls beneath a second predetermined level.

Many level control systems of the prior art utilize mechanical or moving parts such as rubber diaphragms, springs, rods, floats or balls which parts have a tendency to wear out or malfunction. Also, there are level control systems of the prior art which will work only with a liquid having a particular characteristic, such as a particular resistance, and will not work, or will require adjustment, when a liquid having a different characteristic, such as a different resistance, is used. Such systems are not satisfactory for use in sump pits where the liquid varies from being comparatively clean water having a very high resistance to very dirty water containing alkaloids, salts, or acids, having a very low resistance.

According to the invention, a novel solid state electronic control system is provided which has no mechanical or moving parts and which will last indefinitely. The novel electronic circuit of the system according to the invention is designed to work with liquids which vary widely in resistance and the system can thus be used in conjunction with sump pits where the water may vary from being very clean to very dirty.

It is therefore an object of the invention to provide a liquid level control system for a sump pit having no mechanical or moving parts.

It is a further object of the invention to provide a solid state liquid level control system for a sump pit which may be used for controlling the level of liquid which may vary in resistance over a wide range.

According to the invention, first and second electrodes are disposed at different depths in the sump pit. Oe of the electrodes is part of a normally open circuit loop which is closed when the liquid in the pit contacts the electrode, the closed circuit being operative to turn a transistor switch on. The transistor has two relay coils in its collector circuit which become energized when the transistor is turned on. Energization of the first relay is operative to activate a motor to pump liquid from the sump pit and energization of the second relay is operative to connect the second electrode, which is at a lower depth than the first electrode, to the circuit loop. The transistor switch thus remains on and the motor remains activated until the liquid falls beneath the level of the second electrode at which time the circuit loop is broken and the transistor switch and motor are turned off.

The operation of the invention will become more clear when taken in conjunction with the description of the preferred embodiment below and the drawing.

In the drawing, sump pit 1 has electrodes 3 and 4 situated therein at different depths which depths may be adjusted depending on the level of liquid desired in the pit. Motor 23 is the motor of a pump which is in fluid connection with sump pit 1 in a way known to those skilled in the art, for pumping liquid out of the pit. Motor 23 is connected to an AC outlet by means of leads 29 and 32 and plug 25. The motor is grounded by means of lead 30 which is connected to ground prong 28 of plug 25. Lead 32 has triac 24 connected therein and leads 29 and 32 are connected to the primary 20 of step-down transformer 19. The relay switch 7B are resistor 22 are connected in the gate circuit of triac 24.

The secondary 21 of transformer 19 is connected through diode 18 across capacitor 17 which in turn is connected across the emitter 14 of NPN transistor 12 and one end of relay coil 6A. Relay coil 6A is connected in series with relay coil 7A, and diode 16 is connected across the two relay coils. the relay coils 6A and 7A and the diode 16 are connected in the collector circuit of transistor 12. Resistor 10 and capacitor 11 are connected across the base-emitter junction of transistor 12, and electrode 3, diode 8 and resistor 9 are connected to the input of the transistor at resistor 10. Relay switch 6B is connected from the anode of diode 8 to the bottom-most electrode 4 and the sump pit is grounded at 5.

It should be noted that elements 6A and 6B are respectively the coil and switching member of the same relay 6, and coil 7A and switch 7B are respectively the coil and switching member of the same relay 7. It should further be noted that all circuit components used in the present invention are standard components. The diodes, for instance, may be standard silicon diodes and the relays may be dry reed switches. While an NPN transistor is shown, a PNP transistor may be used with appropriate circuitry changes.

Assuming that the liquid in the sump pit is at the level shown in the drawing and has been steadily rising, the motor 23 will be off. Current cannot be supplied to the motor because triac 24 presents an effective open circuit to the flow of current until relay switch 7B is closed and the gate circuit of the triac is activated. An AC voltage is presented at the primary 20 of stepdown transformer 19 on lines 29 and 33 and a smaller AC voltage will exist at the secondary 21 of the transformer 19. The turns ratio of transformer 19 is chosen to meet the DC operating characteristics of transistor 12 as well as the other components in the circuit. The AC voltage across secondary 21 is rectified by halfwave diode rectifier 18 and the rectified signal is presented across capacitor 17 for filtering. Capacitor 17 may, for instance, be a relatively large electrolytic capacitor. The rectified and filtered voltage is presented across one end of relay coil 6A and emitter 14 of transistor 12. Since there is no base current flowing in the transistor, and no forward biasing across the base-emitter junction of the transistor, the transistor will be in the off state and no current will flow in the collector circuit.

When the level of the liquid 2 in sump pit 1 reaches electrode 3, electrode 3 will effectively be connected to the anode of diode 18 through ground and an AC voltage will be present at electrode 3 which is rectified by diode 8 so that a direct current current flows through diode 8 charging capacitor 11 at a rate determined by the resistors 9 and 10. The voltage across capacitor 11 is effective to forward bias the base emitter junction of transistor 12 thereby turning the transistor on and causing current to flow in the collector circuit through relay coils 6A and 7A. The values of resistors 9 and 10 are chosen to limit the base current so as not to damage the transistor, and diode 16 is effective to protect the transistor from high voltage spikes when it turns off.

The current through relay coil 7A is effective to pull in relay switching member 7B, thereby closing the gate circuit of the triac and causing the triac to turn on so that a complete circuit exists from the power source to motor 23 which therefore begins to run and to pump liquid from the sump pit 1. Current flowing through relay coil 6A pulls in relay switching member 6B and thereby connects electrode 4 to the anode of diode 8. The motor 23 will continue to operate and liquid will continue to be pumped out of the sump pit 1 until the liquid level falls beneath electrode 4 at which time the circuit from the anode of diode 8 to ground will be opened and the transistor will turn off and the collector current will fall so as to release relays 6 and 7 from the energized position. Relay switching member 7B opens, thereby turning off the motor and terminating the pumping and relay switching member 6B opens, thereby returning control of the base of the transistor to electrode 3. The transistor will thus not turn on again until the liquid level rises to the height of electrode 3, whereupon the entire process will repeat itself and the motor will turn on, thereby pumping liquid out of the pit until the level of electrode 4 is again reached.

While I have disclosed and described the preferred embodiments of my invention, I wish it understood that I do not intend to be restricted solely thereto, but that I do intend to include all embodiments thereof which would be apparent to one skilled in the art and which come within the spirit and scope of my invention.

What is claimed is:

1. A system for controlling the level of a liquid in an enclosure wherein the liquid may vary in conductivity comprising first and second electrodes inserted in said enclosure at different depths, said first electrode being positioned above said second electrode, means including motor means for emptying liquid from said enclosure, first relay means for activating said motor means when energized, electronic switch means connected in circuit relationship with said first relay means for energizing said first relay means to empty said enclosure when turned on, means for turning said switch means on when the liquid in said enclosure is in electrical contact or is electrically connected to said first electrode and for turning said switch means off when said liquid is not electrically connected to said first electrode, and second relay means in circuit relationship with said electronic switch means for connecting said second electrode to said first electrode when said electronic switch means in turned on so that the switch means is not turned off until said liquid falls beneath the level of said second electrode.

2. The system of claim 1 wherein said electronic switch means is a transistor having a base-emitter junction and wherein said means for turning said switch means on includes a resistor and a capacitor connected across said base-emitter junction.

3. The system of claim 2 wherein said motor means is connected to a power source means through a triac having a gate circuit including said first relay means, said gate circuit being activated to turn said triac on and provide said motor means with electrical power when said first relay means is energized.

4. The system of claim 3 wherein said power source means comprises an alternating current power source means.

5. A system for controlling the level of a liquid in an enclosure wherein the liquid may vary in conductivity comprising first and second electrodes inserted in said enclosure at different depths, means including motor means for emptying liquid from said enclosure, first relay means for activating said motor means when energized, electronic switch means connected in circuit relationship with said first relay means for energizing said first relay means when turned on, a normally open circuit loop including said liquid in said enclosure and said first electrode for turning said electronic switch means on when said liquid contacts said first electrode and closes said circuit loop, and second relay means in circuit relationship with said electronic switch means for connecting said second electrode at said different depth to said circuit loop when energized by the turning on of said electronic switch means, said first electrode being inserted in said enclosure above said second electrode, said circuit loop further including a direct current source of electrical power, said electronic switch means being a transistor having a base-emitter junction and said circuit loop further including a resistor and capacitor connected across said base-emitter junction, said capacitor being charged from said source of electrical power when said circuit is closed to turn said transistor on, said motor means being connected to a power source through a triac having a gate circuit including said first relay means, said gate circuit being activated to turn said triac on and provide said motor means with electrical power when said first relay means is energized, and said first and second relay means being in series circuit relationship with each other and being located in the collector circuit of said transistor.

\* \* \* \* \*